May 19, 1931.  A. G. SEEDIG  1,806,026
SEAT ATTACHMENT
Filed June 5, 1930
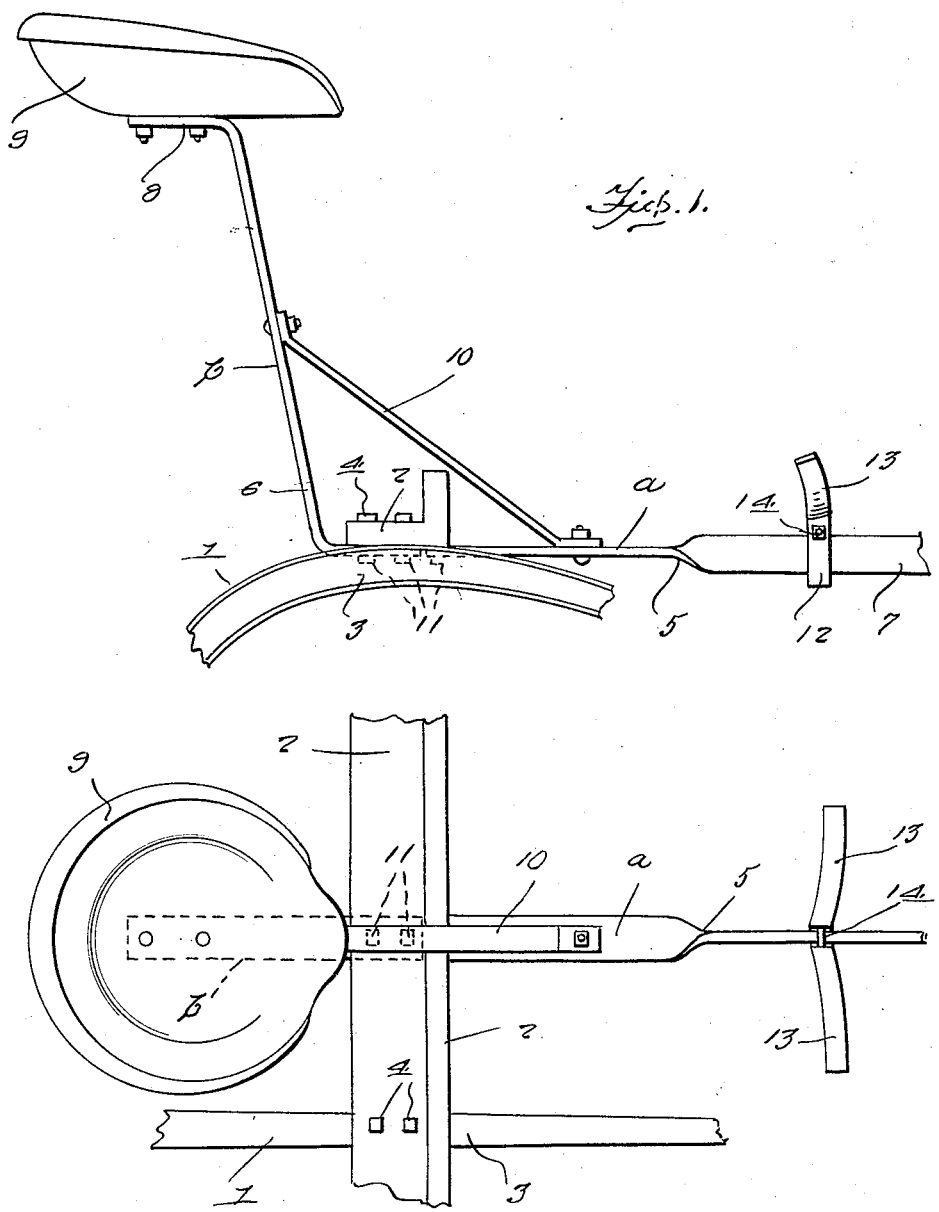

Patented May 19, 1931

1,806,026

UNITED STATES PATENT OFFICE

ADOLPH G. SEEDIG, OF WHEELER, TEXAS

SEAT ATTACHMENT

Application filed June 5, 1930. Serial No. 459,344.

This invention has reference generally to improvements in the seats of a lister and more particularly to an attachment for a two row lister.

The purpose and object of the invention is to provide a seating structure in the nature of an attachment which may be substituted for the usual seat assembly of a lister and which will seat the operator at a greater elevation and farther back in the machine than is the usual custom whereby he is able to better control his teams, see his work, and exercise easier control of all the working parts of the lister.

A further object of the invention is to provide a seating arrangement which includes a novel foot rest which may be adjusted to suit the requirement of the operator.

With the above objects in view, the invention consists in the novel arrangement and construction of parts hereinafter more fully described, with reference to the accompanying drawings, wherein:

Figure 1 is a side view of the attachment,
Figure 2 is a top plan view thereof.

The invention is herein described with reference to its application to a two row lister which is constructed with arched, longitudinally extending and laterally spaced, side beams, one of which is indicated in the drawings at 1. The original seating structure of the lister, including the bar that supports the seat on the machine, is removed and that attachment comprising the present invention is substituted.

This attachment includes a heavy angle bar 2 disposed crosswise of the beams 1 and supported on the throat portions 3 of the latter, to which it is secured by bolts or other fasteners 4. Attached to the cross beams 2 is an end portion of a seat bar which extends longitudinally of the machine with the other end suitably fastened to the front end of the machine frame. The seat bar consists of a substantially elongated narrow flat spring bar which has a bend or twist 5 near its rear portion so as to dispose the broad flat sides of its rearwardly extending portion 6 in horizontal planes and the similar faces of its forwardly extending portion 7 in vertical planes.

The rear portion 6 is bent to provide the angularly disposed sections A and B and is so disposed about the cross beam 2 that the latter is positioned in the crotch thereof with the attaching section A extending horizontally under the beam and the seat supporting section B extending rearwardly and upwardly above the beam at a slight inclination to the vertical and to an appreciable height for seating the operator well above the ground working devices of the machine and, hence out of the dust.

The upper end of section B is bent rearwardly to provide a supporting bracket 8 to which is secured seat 9. A brace bar 10 connects sections A and B outwardly of the crossbeam. The seat bar may be a single length of material or, as illustrated, the sections A and B thereof may be separated parts connected to the cross beam by bolts or other fastening members 11.

Mounted upon the vertically disposed portion 7 of the seat bar is a stirrup strap formed from a flat strip of metal bent upon itself to provide a U-shaped yoke 12 straddling the portion 7 from the under side thereof and having its free end bent outwardly to provide oppositely disposed foot rests 13. The arms of the yoke are connected together below the foot rest by a clamping bolt 14 which may be loosened to permit moving the stirrup forwardly or backwardly upon the portion 7 to suit the legs of the operator.

The drawing shows the front end of the member A as broken off but as before stated the front end of this member is suitably connected with the front part of the frame of the implement.

By thus mounting the seat upon the throat portions of the arched side beams and having it appreciably elevated above the beams, the operator is so placed that he is removed from the dust and better able to see the rows and to handle the team. At the same time, he is located sufficiently near the back of the machine to better observe the planter.

Having thus described my invention, what I claim as new is:

A seat attachment for a two row lister comprising a frame including a pair of spaced longitudinally extending arched side beams, a cross bar connecting said beams and supported on the throat portion of the latter, a seat bar consisting of angularly disposed flat spaced members extending in relatively vertical and horizontal planes about the said cross bar for positioning the latter in the crotch thereof, the horizontally extending member being secured to the under side of said cross bar and extending forwardly thereof and the vertically extending member extending rearwardly and upwardly above the said cross bar, a seat mounted on the upper end of said vertical member, the forwardly extending portion of said horizontal member being twisted intermediate its end to place the flat sides of its forward part in vertical planes and a foot rest member having its central part looped to embrace a portion of the said forward part and means for clamping the loop to the member.

In testimony whereof I affix my signature.

ADOLPH G. SEEDIG.